(12) United States Patent
Lee

(10) Patent No.: US 9,361,803 B2
(45) Date of Patent: Jun. 7, 2016

(54) PARKING ASSISTANCE APPARATUS AND PARKING ASSISTANCE METHOD FOR VEHICLE

(71) Applicant: HYUNDAI MOBIS Co., Ltd., Yongin-si, Gyeonggi-do (KR)

(72) Inventor: Seong Soo Lee, Yongin-si (KR)

(73) Assignee: HYUNDAI MOBIS Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/515,576

(22) Filed: Oct. 16, 2014

(65) Prior Publication Data

US 2015/0179075 A1    Jun. 25, 2015

(30) Foreign Application Priority Data

Dec. 19, 2013  (KR) .................. 10-2013-0159347

(51) Int. Cl.
*B60Q 1/48*     (2006.01)
*G08G 1/16*     (2006.01)
*B62D 15/02*    (2006.01)

(52) U.S. Cl.
CPC ............ *G08G 1/168* (2013.01); *B62D 15/0285* (2013.01); *G08G 1/165* (2013.01)

(58) Field of Classification Search
CPC ................................ G08G 1/168; G08G 1/165
USPC .............. 340/932.2, 435, 436, 437, 438, 937; 180/199; 348/333.03
See application file for complete search history.

(56) References Cited

U.S. PATENT DOCUMENTS

| | | | | |
|---|---|---|---|---|
| 7,969,326 B2 * | 6/2011 | Sakakibara | ........ | B62D 15/0275 340/932.2 |
| 8,248,220 B2 * | 8/2012 | Nagamine | .............. | B60Q 9/005 180/169 |
| 8,816,878 B2 * | 8/2014 | Kadowaki | .......... | B62D 15/0285 340/438 |
| 8,907,815 B2 * | 12/2014 | Kadowaki | .......... | B62D 15/0275 180/199 |

\* cited by examiner

*Primary Examiner* — Toan N Pham
(74) *Attorney, Agent, or Firm* — Paratus Law Group, PLLC

(57) ABSTRACT

Disclosed are a parking assistance apparatus and a parking assistance method for a vehicle. The parking assistance apparatus for a vehicle according to the exemplary embodiment of the present invention may include: a parking line detecting unit which detects a left parking line and a right parking line of a parking space based on an image; an obstacle sensing unit which detects an obstacle existing within a predetermined distance based on a sensor; and a route creating unit which combines information about positions of the left parking line, the right parking line, and the obstacle, and creates a parking route.

15 Claims, 9 Drawing Sheets

(a)

(b)

(C)

(d)

(a)

(b)

(a)

(b)

(b)

(b)

PARKING ASSISTANCE APPARATUS AND PARKING ASSISTANCE METHOD FOR VEHICLE

CROSS-REFERENCE TO RELATED APPLICATIONS

The present application claims priority to Korean Patent Application Number 10-2013-0159347 filed Dec. 19, 2013, the entire contents of which the application is incorporated herein for all purposes by this reference.

TECHNICAL FIELD

The present invention relates to a parking assistance apparatus and a parking assistance method for a vehicle, and more particularly, to a parking assistance apparatus and a parking assistance method for a vehicle, which creates parking route information when parking a vehicle, or assists driver in operating a steering wheel.

BACKGROUND

A parking assistance apparatus is a system which assists a driver to more easily and conveniently park a vehicle, recognizes a parking space using a sensor or the like mounted to the vehicle, calculates an optimum route along which the vehicle may be parked in the recognized parking space, and automatically controls a steering wheel or assists the driver in operating the steering wheel in visual and auditory manners.

As an example of the parking assistance apparatus, a parking assistance apparatus based on an ultrasonic sensor has been introduced in the corresponding technical field. The parking assistance apparatus based on the ultrasonic sensor recognizes obstacles at the periphery of the vehicle in which the driver is seated, and a parking space based on an ultrasonic signal, and creates a movement route of the vehicle and the like. However, in a case in which there is no obstacle within a predetermined distance from the vehicle in which the driver is seated, the parking assistance apparatus based on the ultrasonic sensor has a deteriorated recognition rate for the parking space, and is greatly affected by an arrangement state of obstacles at the periphery of the parking space, and as a result, there is a limitation to the use of the parking assistance apparatus based on the ultrasonic sensor, and to the environment to which the parking assistance apparatus based on the ultrasonic sensor is applied.

Recently, in order to solve the aforementioned problems, a parking assistance apparatus based on an image captured by a camera mounted to the vehicle has been developed, but also has a limitation when coping with various situations or the environment to which the parking assistance apparatus based on an image is applied.

SUMMARY

The present invention has been made in an effort to provide a parking assistance apparatus and a parking assistance method for a vehicle, which may improve convenience for a driver.

Particularly, the present invention has been made in an effort to provide an optimum parking route produced in consideration of intervals from other vehicles by combining an image captured by a camera mounted to a vehicle with information about an obstacle detected by a sensor (for example, a distance detecting sensor), thereby improving convenience for a driver when the driver gets in and out of the vehicle.

Technical problems of the present invention are not limited to the aforementioned technical problems, and other technical problems, which are not mentioned above, may be clearly understood by those skilled in the art from the following descriptions.

An exemplary embodiment of the present invention provides a parking assistance apparatus for a vehicle including: a parking line detecting unit which detects a left parking line and a right parking line of a parking space based on an image; an obstacle sensing unit which detects an obstacle existing within a predetermined distance based on a sensor; and a route creating unit which combines information about positions of the left parking line, the right parking line, and the obstacle, and creates a parking route.

Another exemplary embodiment of the present invention provides a method of operating a parking assistance apparatus for a vehicle, including: detecting a left parking line and a right parking line of a parking space, and an obstacle; and creating a parking route by combining information about positions of the left parking line, the right parking line, and the obstacle. Here, the left parking line and the right parking line may be detected based on an image, and the obstacle may be detected based on a sensor.

Specific items of other exemplary embodiments are included in the detailed description and the drawings.

The parking assistance apparatus and the parking assistance method according to the exemplary embodiments of the present invention determine the parking position and the like by selectively utilizing a result of detecting the parking line based on an image and a result of detecting the obstacle based on a sensor, thereby allowing a more flexible and proper parking guide to be performed in accordance with various situations.

Particularly, the present invention provides an optimum parking route produced in consideration of intervals from other vehicles, by combining an image captured by a camera mounted to a vehicle with information about an obstacle detected by a sensor (for example, a distance detecting sensor), thereby improving convenience for a driver when the driver gets in and out of the vehicle.

Therefore, the parking assistance apparatus and the parking assistance method according to the exemplary embodiments of the present invention may overcome the technical limitation of the parking assistance apparatus based on ultrasonic or the parking assistance apparatus based on the image in the related art, and may create correct parking route information based on a position relationship between the vehicle and the parking space.

The effects of the present invention are not limited to the aforementioned effects, and other effects, which are not mentioned above, will be clearly understood by those skilled in the art from the claims.

DETAILED DESCRIPTION

Advantages and features of the present invention and methods of achieving the advantages and features will be clear with reference to exemplary embodiments described in detail below together with the accompanying drawings. However, the present invention is not limited to exemplary embodiments disclosed herein but will be implemented in various forms. The exemplary embodiments are provided only to make disclosed contents thorough and complete and sufficiently transfer the spirit of the present invention to those skilled in the art. Therefore, the present invention will be defined by the description of the claims. Meanwhile, terminologies used in the present invention are to explain exemplary embodiments rather than limiting the present invention.

Unless particularly stated otherwise in the present specification, a singular form also includes a plural form. The meaning of "comprises" and/or "comprising" used in this specification does not exclude the existence or addition of aforementioned constituent elements, steps, operations, and/or device, and one or more other constituent elements, steps, operations, and/or devices.

In the present specification, names of constituent elements are classified as a first . . . , a second . . . , and the like so as to discriminate the constituent elements having the same name, and the names are not essentially limited to the order in the description below.

Figure 1:
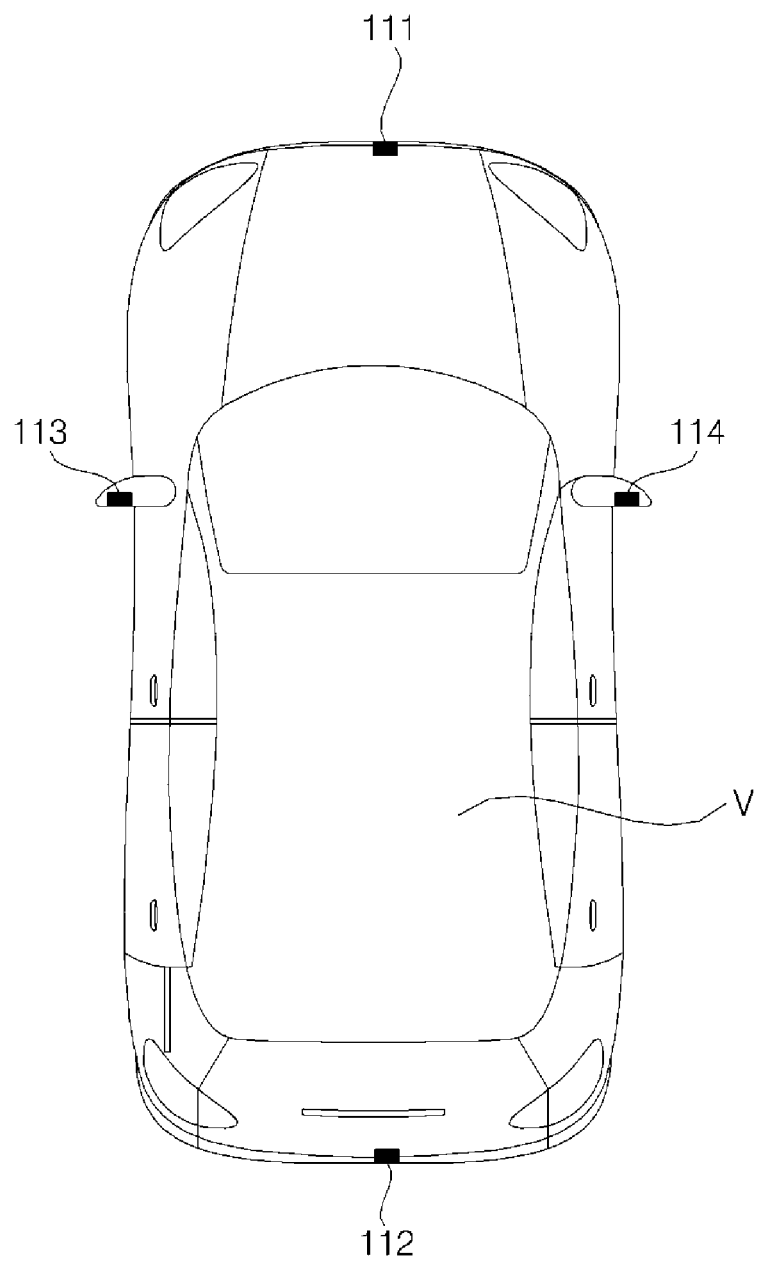
FIG. 1 is an exemplified view illustrating a state in which cameras of an AVM system are mounted to a vehicle in accordance with an exemplary embodiment of the present invention.

FIG. 1 is an exemplified view illustrating a state in which cameras are mounted to a vehicle V in accordance with an exemplary embodiment of the present invention.

Referring to FIG. 1, a plurality of cameras 110, 120, 130, and 140, which are included in an image acquiring module 11 that will be described below, may be mounted to the vehicle V. Here, the plurality of cameras 110, 120, 130, and 140 may be four so as to acquire images for a front direction, a rear direction, a left-lateral direction, and a right-lateral direction of the vehicle V, but more or less than four cameras may be included according to a view angle, a mounted position, or the like of the camera.

The plurality of cameras 110, 120, 130, and 140 is mounted to the vehicle V, photographs physical spaces existing within a predetermined distance from the vehicle V, and generates image signals. Here, the plurality of cameras 110, 120, 130, and 140 may be super wide angle cameras having a view angle of 180 degrees or more.

The first camera 111 may be mounted at a front side of the vehicle V to photograph a front image. The first camera 111 may be mounted to a part of a front bumper. The second camera 112 may be mounted at a rear side of the vehicle V to photograph a rear image. The second camera 112 may be mounted to a part of a rear bumper, or an upper part or a lower part of a license plate. The third camera 113 may be mounted at a left-lateral side of the vehicle V to photograph an image around the left-lateral side. The third camera 113 may be mounted to a part of a left side mirror of the vehicle V or a part of a front fender. The fourth camera 114 may be mounted at a right-lateral side of the vehicle V to input an image around the right-lateral side. The fourth camera 114 may be mounted to a part of a right side mirror of the vehicle V or a part of the front fender.

Figure 2:
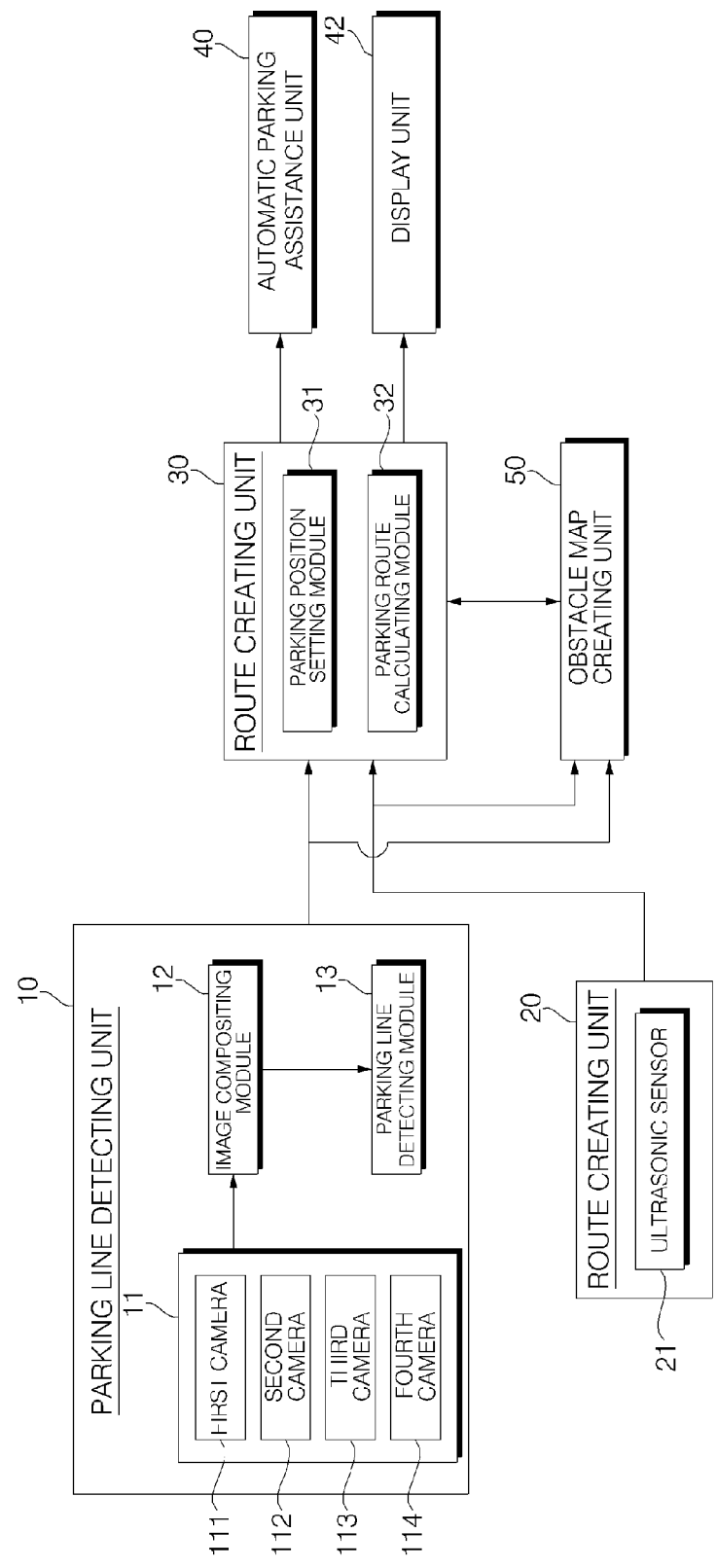
FIG. 2 is a configuration diagram of a parking assistance apparatus for a vehicle according to the exemplary embodiment of the present invention.

FIG. 2 is a configuration diagram of the parking assistance apparatus for a vehicle V according to the exemplary embodiment of the present invention.

Referring to FIG. 2, the parking assistance apparatus for a vehicle V according to the present exemplary embodiment may include a parking line detecting unit 10, an obstacle sensing unit 20, and a route creating unit 30. In addition, the parking assistance apparatus for a vehicle V according to the present exemplary embodiment may further include at least any one of an automatic parking assistance unit 40 and an obstacle map creating unit 50.

The parking line detecting unit 10 detects the parking line, which divides the parking space, based on an image or an image signal that is created by photographing a three-dimensional space at the periphery of the vehicle V.

The obstacle sensing unit 20 detects obstacles at the periphery of the parking space based on a sensor or the like. Specifically, the obstacle sensing unit 20 may include one or more ultrasonic sensors 21. The one or more ultrasonic sensors 21 are mounted at the front side, the rear side, the left side, the right side, or the like of the vehicle V, and detect a position, a distance, or the like of the obstacle existing within a predetermined distance from the vehicle V (for example, at the periphery of the parking space). As the obstacle that may be detected by the obstacle sensing unit 20, other vehicles, which are parked by the side of the parking space, may be representatively exemplified, but the present invention is not limited thereto.

Information about the parking line detected by the parking line detecting unit 10 and information about the obstacle detected by the obstacle sensing unit 20 are provided to the route creating unit 30, and may be used to set a parking position of the vehicle V in the parking space and a parking route that is required for the vehicle to move to a corresponding parking position. Particularly, the parking assistance apparatus S according to the present exemplary embodiment combines a result of detecting the parking line based on the image and a result of detecting the obstacle based on the sensor so as to allow the vehicle V to be guided to and parked at a more proper parking position.

Hereinafter, the respective configurations will be described in more detail.

The parking line detecting unit 10 may detect the parking line, which divides the parking space, based on image information. In this case, the parking line may mean parking lines which are disposed at the left and right sides of the vehicle V in the parking space, or a pair of left and right parking lines which is disposed in a longitudinal direction of the vehicle V.

The parking line detecting unit 10 may include an image acquiring module 11. The image acquiring module 11 may acquire images at the periphery of the vehicle V using the one or more cameras 111, 112, 113, and 114 that are provided inside or outside the vehicle. Specifically, the image acquiring module 11 may create an original image signal by projecting a three-dimensional real space, which exists within a predetermined distance from the vehicle V, onto a two-dimensional plane or a virtual three-dimensional space.

For example, the image acquiring module 11 includes the plurality of cameras, which is disposed at the front side, the rear side, the left side, or the right side of the vehicle V, and photographs the front side, the rear side, the left side, or the right side of the vehicle V, thereby acquiring images at the periphery of the vehicle V. Here, the image at the periphery of the vehicle V means an image, which is photographed by each of the cameras mounted to the vehicle V and has a visual field in a predetermined range, and the predetermined range may be determined by external factors (for example, a height, an angle, and the like) associated with a state in which the cameras are mounted to the vehicle V, or internal factors (a view angle, a focal length, and the like) associated with the cameras themselves.

The parking line detecting unit 10 may include an image compositing module 12. The image compositing module 12 composites images at the periphery of the vehicle V which are provided by the image acquiring module 11, and creates a composite image in the form of a top view or an around view. The composite image in the form of a top view or an around view means an image when looking down at the vehicle V from a virtual position at a predetermined height, and because this image compositing technique is publicly known under the name of an around view monitoring system (AVM) in the corresponding technical field, a detailed description thereof will be omitted.

The parking line detecting unit 10 may include a parking line detecting module 13. The parking line detecting module 13 receives the composite image in the form of a top view or an around view from the image compositing module 12, and may detect the parking line by image processing the composite image.

The automatic parking assistance unit 40 automatically controls an operation of a steering wheel of the vehicle V, or assists and guides the driver in the vehicle V using visual and auditory means (for example, an image display module, a speaker, a haptic module, and the like) so that the vehicle V may be parked at a predetermined parking position set by the route creating unit 30.

Figure 3:
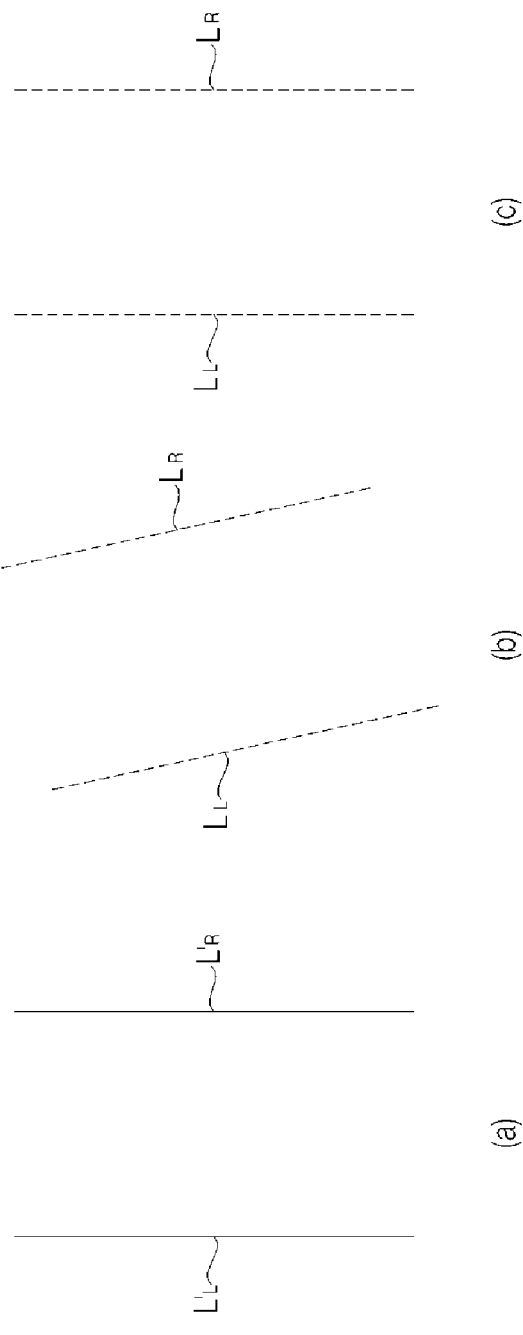
FIG. 3 is an exemplified view illustrating a state in which an obstacle map creating unit estimates a vehicle position, and calibrates position information about a parking line.

FIG. 3 illustrates an example in which the obstacle map creating unit estimates a vehicle position, and calibrates position information about a parking line.

The obstacle map creating unit 50 creates an obstacle map using information about positions of a left parking line LL and a right parking line LR and information about a position of an obstacle O. Specifically, the obstacle map creating unit 50 may store initial position information LL' and LR', which is created when a parking mode is activated, among the information about the positions of the left parking line LL and the right parking line LR which is continuously detected from the composite image, in an obstacle map, as illustrated in FIG. 3A.

The obstacle map creating unit 50 may estimate the current position of the vehicle V using odometry of the vehicle. For example, the obstacle map creating unit 50 may estimate a change in the position of the vehicle V based on information about movement of the vehicle V such as a direction of a wheel or a rotation amount that varies with respect to time.

Accordingly, as illustrated in FIG. 3B, the obstacle map creating unit 50 may store the information about the left parking line LL and the right parking line LR, which are currently detected, in the obstacle map based on the current position of the vehicle.

As illustrated in FIG. 3C, the obstacle map creating unit 50 may calibrate the information about the positions of the left parking line LL and the right parking line LR which are currently detected, based on the initial information about the positions of the left parking line LL' and the right parking line LR' which is stored in the obstacle map. Accordingly, it is possible to improve accuracy of a position relationship of the left parking line and the right parking line with respect to the position of the obstacle detected based on the sensor.

Figure 4:
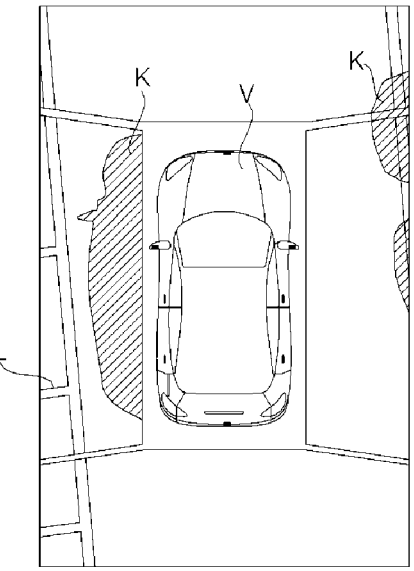
FIG. 4 is an exemplified view illustrating a process in which the parking assistance apparatus for a vehicle according to the exemplary embodiment of the present invention detects the parking line by image processing a composite image.
Figure 4:
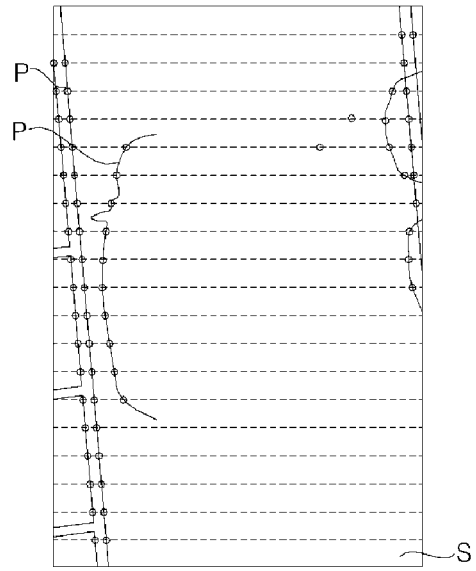
Figure 4:
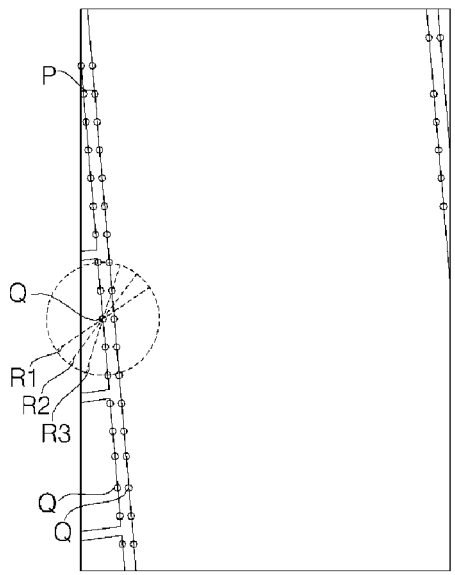
Figure 4:
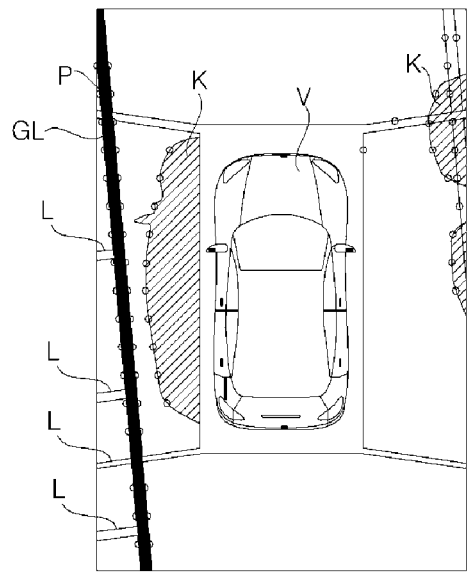

FIG. 4 is an exemplified view illustrating a process in which the parking line detecting module 13 illustrated in FIG. 2 detects the parking line by image processing the composite image.

For reference, FIGS. 4B and 4C illustrate contour line images of the composite image, and it is noted that a light and darkness region is reversed for ease of illustration (that is, it is noted that in FIGS. 4B and 4C, the black line is a light (white) line in the real contour line image, and the white background is a dark (black) region in the real contour line image.

The parking line detecting module 13 may extract a candidate point Q, which corresponds to the parking line L and has a predetermined brightness pattern, from the composite image.

Specifically, the parking line detecting module 13 may create the contour line image using the composite image illustrated in FIG. 4A. Here, because the contour line image may be created using a publicly known edge detection technique, a specific description regarding the edge detection technique will be omitted.

The parking line detecting module 13 may divide the contour line image into a plurality of sections S. In this case, the plurality of sections S may be regions created by dividing the contour line image for every predetermined interval in a first direction (for example, a vertical direction) by the parking line detecting module 13.

As illustrated in FIG. 4B, the parking line detecting module 13 may extract a plurality of feature points P by searching for each section S of the contour line image in a second direction (for example, a direction orthogonal to the first direction). Here, the feature points P may mean points positioned at a border of the contour line having a gradient of light and darkness having a predetermined size or greater when each section S is searched in the second direction.

For example, the feature points P may be points positioned at a border of the black line and the white line included in the contour line image. In this case, the black line and the white line may mean both sides of the border of the contour line which are distinguished on the basis of the predetermined contrast ratio.

Referring to FIG. 4C, the parking line detecting module 13 may select some feature points P having a brightness pattern of the parking line L from the plurality of feature points P, and create a combination of the candidate points Q of the parking line.

For example, the parking line L is generally displayed by a bright color, such as white or yellow, so that some feature points P exhibiting the brightness change pattern in an order of dark, bright, and dark may be selected as the candidate points Q in the search in the second direction (for example, the horizontal direction) for each section S, and used for detecting the parking line L. In this case, the brightness change pattern may be preset so that the feature points P positioned at the contour line, in which a contrast ratio between a bright region and a dark region has a predetermined value or greater, are detected as the candidate points Q.

In this case, a width of the bright region of the bright change pattern may be preset so as to be recognized in a predetermined error range based on a width of the general parking line. For example, in a state in which the parking line detecting module 13 is set to recognize, as the candidate point Q, the case where the width of the bright region included in the contour line image is 20 to 30 cm, the bright pattern having the width of the bright region of 40 cm may be excluded from a target for selecting the candidate point Q. Accordingly, the feature point P of the contour line by a shadow K may be excluded from the target for selecting the candidate point Q.

The parking line detecting module 13 may detect the parking line L from the plurality of candidate points Q selected by a line fitting process. That is, the parking line detecting module 13 may detect the left parking line and the right parking line.

Referring to FIG. 4C, the parking line detecting module 13 may search for each section for every predetermined angle in a 360 degree direction based on each candidate point Q, and extract a straight line included in the contour line from one or more straight lines R1, R2, and R3 passing through each candidate point Q.

The parking line detecting module 13 may select and detect the candidate parking line, which passes through the largest number of candidate points Q, among the candidate parking lines (for example, R1, R2, and R3) extracted as illustrated in FIG. 4D, as a final parking line (corresponding to the parking line indicated by the thick line in FIG. 5D). The process, which has been described with reference to FIGS. 4A and 4B, may be of course applied to detect the respective four parking lines that constitute one parking space.

Meanwhile, FIG. 4 illustrates a configuration in which three straight lines R1, R2, and R3 pass through any candidate point Q, but this example is merely for convenience of description, and it can be understood that the parking line detecting module 13 may create two or less or four or more straight lines when searching for each section in the 360 degrees direction. For example, in a case in which the search is performed for every 90 degrees in the 360 degrees direction, two straight lines may be created, and in a case in which the search is performed for every 10 degrees, eighteen straight lines may be created.

The parking line detecting module 13 may determine whether the detected left and right parking lines conform with a geometric condition and the like of the real parking line.

That is, the parking line detecting module 13 may determine whether an interval between the detected left and right parking lines, directions of the detected left and right parking lines, and the like conform with a predetermined geometric condition of the real parking line. For example, an interval between two parking lines L positioned at the left and right sides of the vehicle V needs to be greater than a width of the vehicle V in order to park the vehicle V. Therefore, in a case in which the interval between the left parking line and the right parking line is smaller than the width of the vehicle V, the parking line detecting module 13 may determine that the detected left and right parking lines do not conform with the geometric condition. In this case, information (for example, an interval between final parking lines, a vehicle width, a permitted error range, and the like) for confirming whether to conform with the geometric condition may be preset in the parking line detecting module 13.

Next, the route creating unit 30 sets the parking position of the vehicle V and creates the parking route of the vehicle V to the parking position based on information about the previously detected final parking line L and the obstacle.

In particular, the route creating unit 30 according to the present exemplary embodiment sets the parking position and the like using not only one information based on the image or the sensor, but also information about the parking line and the obstacle based on the image and the sensor, thereby allowing the vehicle V to be guided to and parked at a more proper position in the parking space.

Specifically, the route creating unit 30 may include a parking position setting module 31. The parking position setting module 31 may receive information about the positions of the left parking line, the right parking line, and the obstacle from the parking line detecting unit 10 and the obstacle sensing unit 20. In addition, the parking position setting module 31 may set the parking position of the vehicle V based on the information about the positions of the left parking line, the right parking line, and the obstacle. In this case, the parking position setting module 31 may create a parking guide line GL in a region which is positioned between the left parking line and the right parking line, and spaced apart from the obstacle at a predetermined first distance d1 or more.

In this case, the parking position, which is set by the parking position setting module 31, may be variously set based on a result of detecting obstacles at the periphery of the parking space. For example, the parking position setting module 31 may differently set the parking position of the vehicle v in accordance with a case in which no obstacle exists within a predetermined distance from the parking space, a case in which an obstacle exists only at one of the left and right sides, and a case in which obstacles exist at both the left and right sides. The purpose of the aforementioned configuration is to improve convenience for the driver by allowing the vehicle v to be parked at a more proper position, and ensuring an interval that is required when the driver gets in and out of the vehicle, for each situation.

Hereinafter, a method of setting the parking position for each situation will be described in more detail with reference to the drawings.

Figure 5:
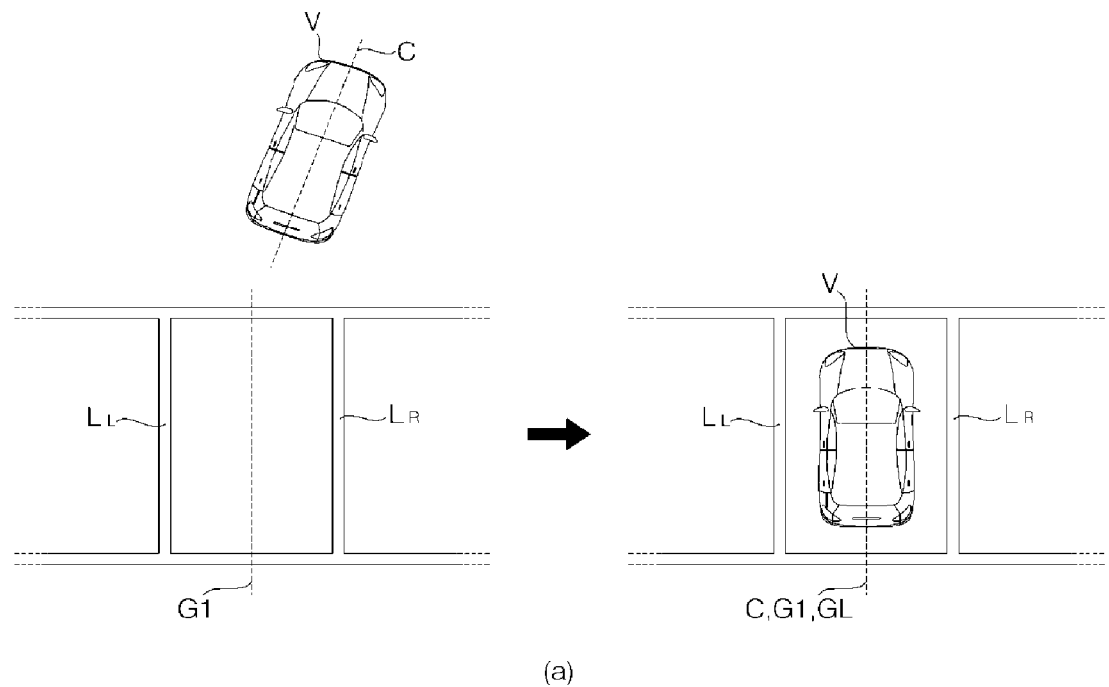
FIG. 5 is an exemplified view illustrating a method of setting a parking position in a case in which no obstacle exists at both sides of a parking space.
Figure 5:
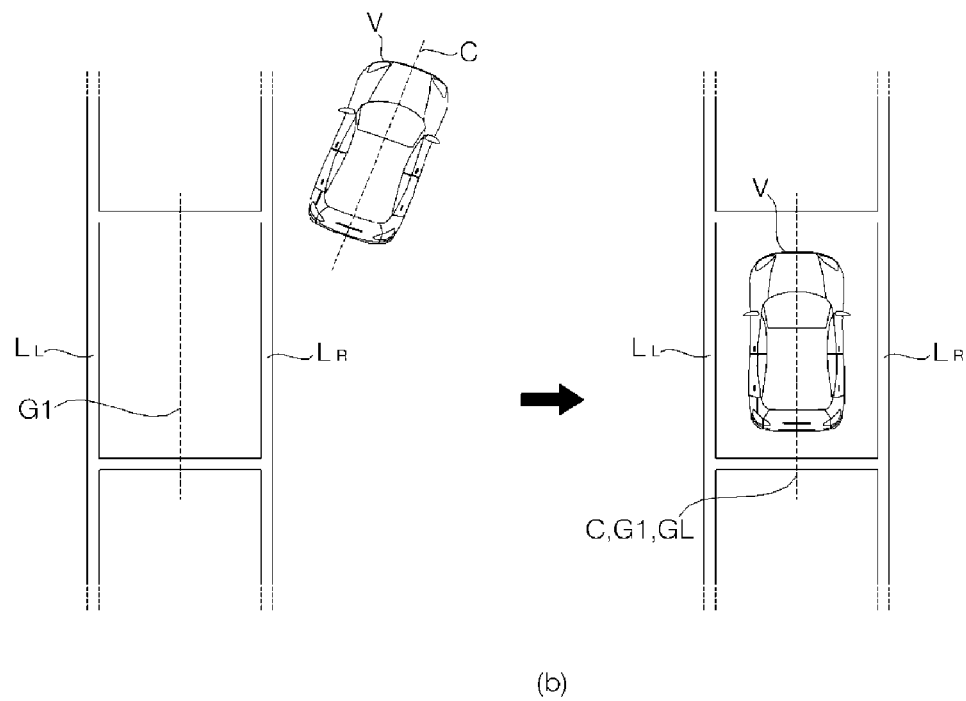

FIG. 5 is an exemplified view illustrating a method of setting the parking position in a case in which no obstacle exists at both sides of the parking space, and FIG. 5A illustrates the case of perpendicular parking (for example, back-in parking, and front-in parking), and FIG. 5B illustrates the case of parallel parking.

Referring to FIG. 5, the parking position setting module 31 may set the parking position of the vehicle V based on a center between the left parking line LL and the right parking line LR that are detected by the parking line detecting unit 10. That is, in a case in which no obstacle exists at both sides of the parking space, a first virtual line G1, which is positioned at the same distance from the left parking line LL and the right parking line LR, may be set as the parking guide line GL.

In this case, the parking guide line GL may be calculated based on a longitudinal centerline that is parallel with the left parking line LL and the right parking line LR that are detected by the parking line detecting unit 10. The parking guide line GL may be a reference for determining the parking position of the vehicle V or calculating the parking route of the vehicle V. In other words, in a case in which no obstacle exists at both sides of the parking space, the parking position setting module 31 may set the first virtual line G1, which is a longitudinal centerline LC of the left parking line LL and the right parking line LR, as the parking guide line GL. A parking route calculating module 32 and the like, which will be described below, may calculate the parking route and the like of the vehicle V so that a longitudinal central axis C of the vehicle V matches the predetermined parking guide line GL. Accordingly, the vehicle V may be guided and parked to a center of the parking space which is divided by the left parking line LL and the right parking line LR.

In particular, the parking assistance apparatus S according to the present exemplary embodiment may have a technical advantage in that the operation of setting the parking guide line GL may be performed by the left parking line LL and the right parking line LR that are detected based on the image. For example, in a case in which the parking space is recognized only by the sensor, an error may be included in the information created as the parking route due to a lack of information required to recognize the parking space when no obstacle (for example, other parked vehicles V and the like) exists at the periphery of the parking space. In contrast, according to the present exemplary embodiment, since the left parking line LL and the right parking line LR are detected based on the image, and the parking guide line GL and the like may be set in accordance with the position relationship between the detected left parking line LL and the detected right parking line LR, the parking route along which the vehicle V may be guided to the proper parking space even in a case in which no obstacle exists at the periphery of the vehicle may be created.

Figure 6:
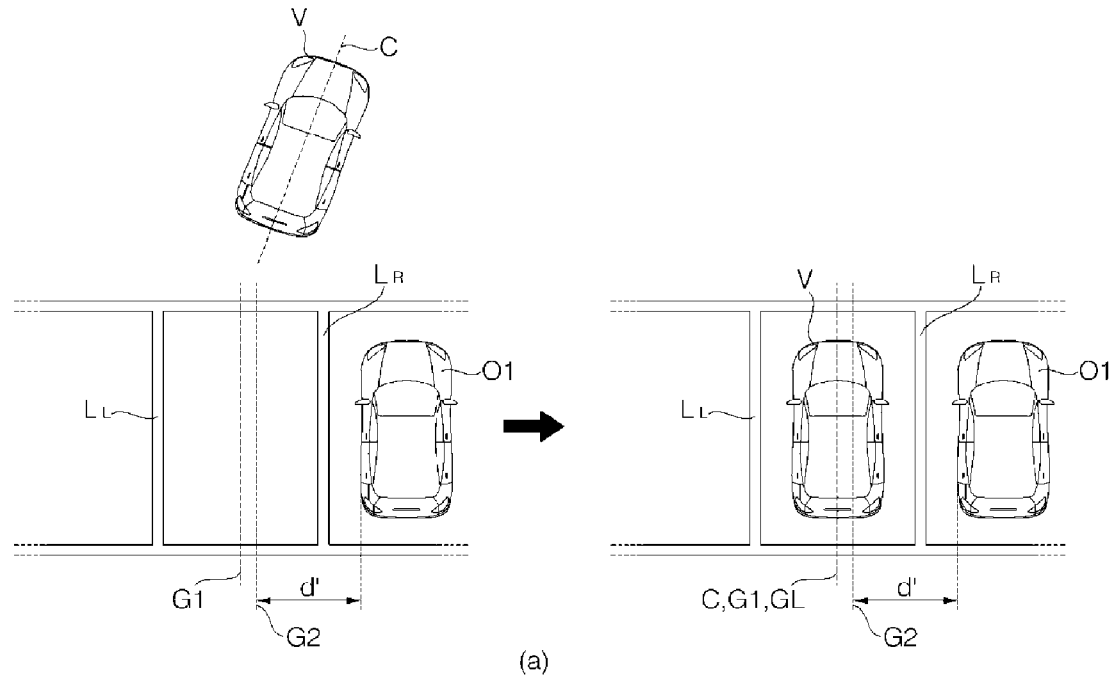
FIG. 6 is an exemplified view illustrating a method of setting a parking position in a case in which an obstacle exists only at one side of the parking space in the case of perpendicular parking.
Figure 6:
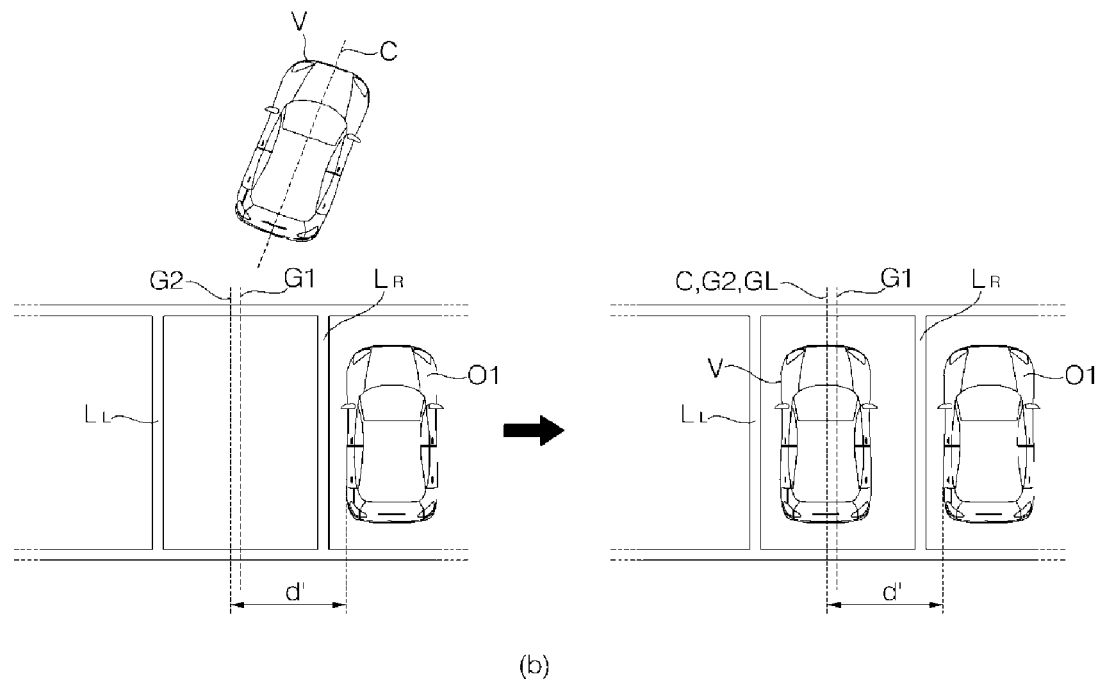

FIG. 6 is an exemplified view illustrating a method of setting a parking position in a case in which an obstacle exists only at one side of the parking space in the case of perpendicular parking.

Referring to FIG. 6, a first obstacle (for example, other parked vehicles) may exist at one side of the parking space where the vehicle V, which attempts to perform perpendicular parking, is intended to be parked. In this case, the parking position setting module 31 may set any one of the first virtual line G1, which is the longitudinal centerline LC of the left parking line LL and the right parking line LR, and the second virtual line G2, which is spaced apart from a first obstacle O1 at the predetermined first distance d1, as the parking guide line GL.

Specifically, the parking position setting module 31 may receive a result of detecting the obstacle from the obstacle sensing unit 20, and may determine whether the obstacle O exists at the periphery of the parking space. More specifically, when the first obstacle O1, which exists in any one region of a region within the predetermined first distance d1 in a left direction from the left parking line, and a region within the first distance d1 in a right direction from the right parking line, is detected by the obstacle sensing unit 20, the parking position setting module 31 may set the virtual line, which is further spaced apart from the first obstacle O1 between the first virtual line G1, which is positioned within the same distance from the left parking line LL and the right parking line LR, and the second virtual line G2, which is spaced apart from the first obstacle O1 at the predetermined first distance d1, as the parking guide line GL. In this case, the first distance d1 may be a value that is preset in consideration of a minimum distance from the obstacle O which is required for the driver in the vehicle V to open and close a door.

The parking guide line GL, which has been set as described above, may be a reference for determining the parking position or the movement route of the vehicle V, as described above with reference to FIG. 5.

As illustrated in FIG. 6A, in a case in which the first virtual line G1 is further spaced apart from the first obstacle O1 than the second virtual line G2, the parking position setting module 31 sets the first virtual line G1 as the parking guide line GL. In this case, the parking position or the parking route of the vehicle V is consequently similar to that described above with reference to FIG. 5.

In another example, as illustrated in FIG. 6B, in a case in which the second virtual line G2 is further spaced apart from the first obstacle O1 than the first virtual line G1, the parking position setting module 31 sets the second virtual line G2 as the parking guide line GL. The purpose of the aforementioned configuration is to allow the vehicle V to be parked at the parking position that is sufficiently spaced apart from the first obstacle O1, thereby allowing the driver to easily get in and out of the vehicle after the vehicle is parked.

The case as illustrated in FIG. 6B may be an example in which another vehicle O1, which is parked at the left side or the right side of the corresponding parking space, is parked so as to be too close to the right parking line LR, such that the interval, which is required for a passenger in the vehicle V to get in and out of the vehicle, may not be ensured. In this situation, when the parking route is created only based on the information about the positions of the left parking line LL and the right parking line LR that are detected from the image, the interval between the vehicle V and another vehicle O1, which is required for the driver to get in and out of the vehicle, may not be ensured, thereby causing inconvenience. The parking assistance apparatus S according to the exemplary embodiment of the present invention may reduce inconvenience for the driver by reflecting information about the position of the obstacle, which is detected based on the sensor, to set the parking guide line GL and the like.

Figure 7:
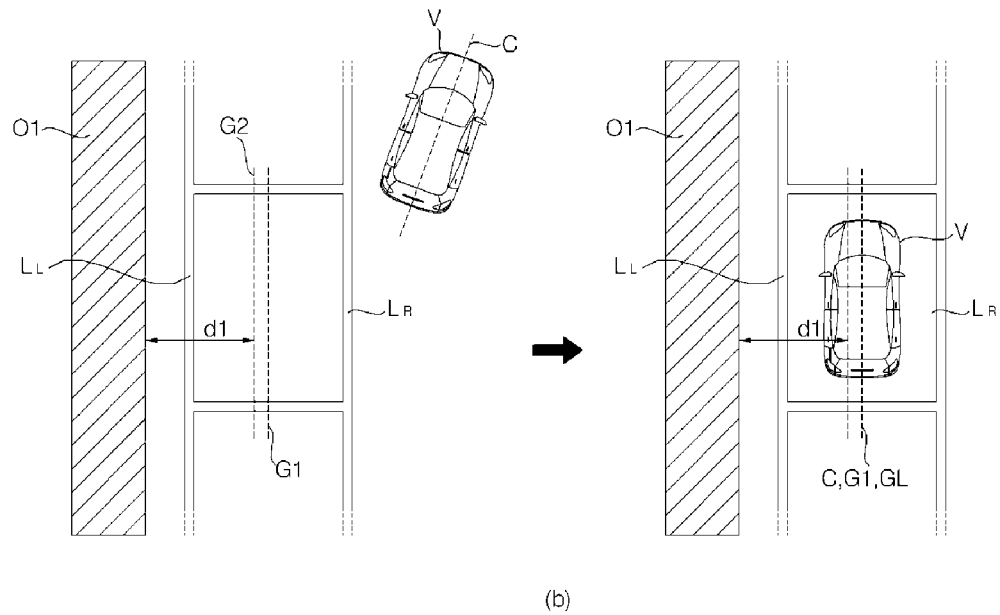
FIG. 7 is an exemplified view illustrating a method of setting a parking position in a case in which an obstacle exists only at one side of the parking space in the case of parallel parking.
Figure 7:
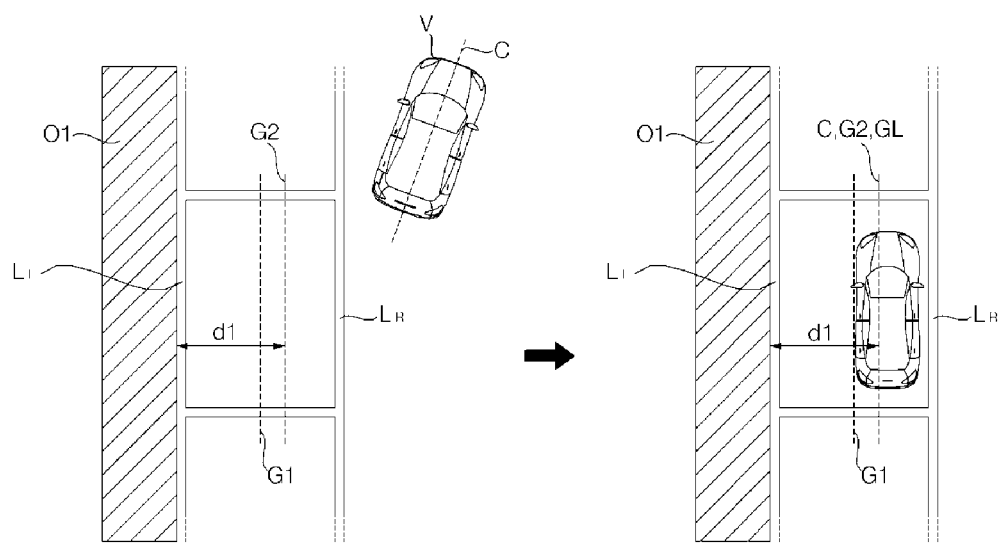

FIG. 7 is an exemplified view illustrating a method of setting a parking position in a case in which an obstacle exists only at one side of the parking space in the case of parallel parking.

Referring to FIG. 7, even in the case of parallel parking, an obstacle (for example, a wall surface) may exist only at one side of the parking space. In this case, similar to the configuration that has been described above with reference to FIG. 6, the parking position setting module 31 calculates the first virtual line G1, which is the longitudinal centerline of the left parking line LL and the right parking line LR, and the second virtual line G2, which is spaced apart from the first obstacle O1 at the first distance d1, and may set the virtual line, which is slightly further spaced apart from the first obstacle O1, between the first virtual line G1 and the second virtual line G2, as the parking guide line GL.

For example, FIG. 7A illustrates a case in which the first virtual line G1 is set as the parking guide line GL, and FIG. 7B illustrates a case in which the second virtual line G2 is set as the parking guide line GL. The reason is that the case illustrated in FIG. 7A has a wider interval between the obstacle O and the left parking line than the case illustrated in FIG. 7B.

Similar to the configuration that has been described above with reference to FIG. 6, the purpose of the aforementioned configuration is to ensure a separation distance between the vehicle V and the obstacle O which is required at a minimum for the driver to get in and out of the vehicle, and allow the driver to easily get in and out of the vehicle, and to minimize a risk that the vehicle V unexpectedly collides with the obstacle and the like.

Figure 8:
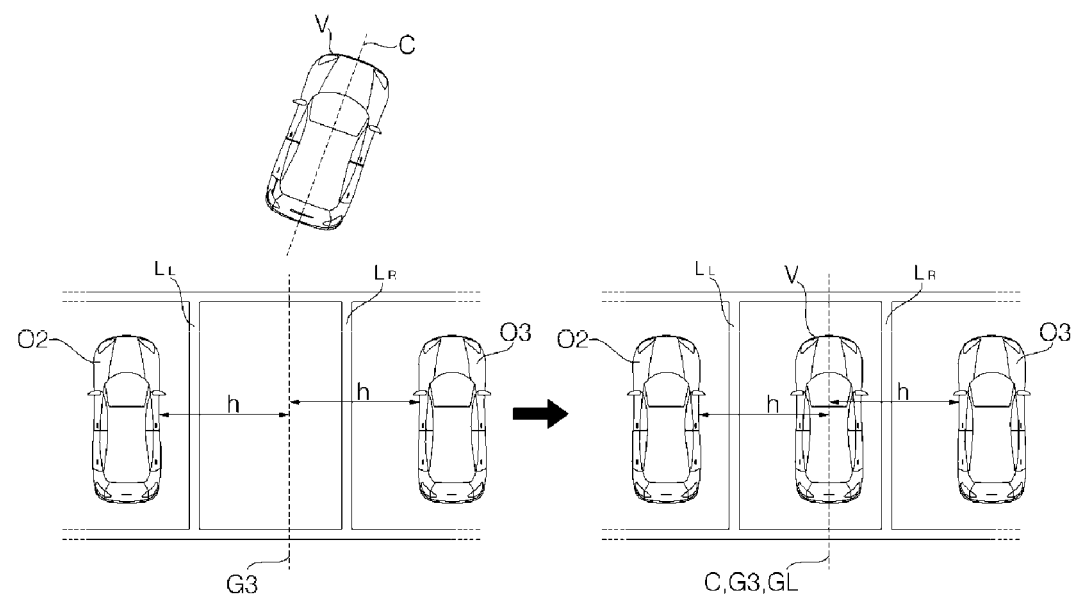
FIG. 8 is an exemplified view illustrating a method of setting a parking position in a case in which obstacles exist at both sides of the parking space.

FIG. 8 is an exemplified view illustrating a method of setting a parking position in a case in which obstacles exist at both sides of the parking space.

Referring to FIG. 8, obstacles O2 and O3 may exist at both the left and right sides of the parking space. Representatively, this situation may occur when other vehicles are parked at both the left and right sides of the parking space in the case of perpendicular parking.

Accordingly, when it is determined that the obstacles O2 and O3 exist at both sides of the parking space, the parking position setting module 31 may set a third virtual line G3, which is a centerline positioned at the same distance h from both the obstacles O2 and O3, as the parking guide line GL.

Specifically, when the second obstacle O2, which exists in a region within a second distance in the left direction of the left parking line, and the third obstacle O3, which exists in a region within the second distance in the right direction of the right parking line, are simultaneously detected by the obstacle sensing unit 20, the parking position setting module 31 may set the third virtual line G3, which is positioned within the same distance h from the second obstacle O2 and the third obstacle O3, as the parking guide line GL.

Here, the second distance (not illustrated) may be a distance that is a reference for determining whether to use information about the position of the obstacle when the parking route is created. Specifically, when obstacles are positioned to be spaced far away from the left parking line LL or the right parking line LR even though the obstacles exist only at one side or at both sides of the parking space, a possibility that the driver is inconvenienced due to other parked vehicles when the driver gets in and out of the vehicle may be low. Therefore, information about the second distance is preset to the parking position setting module 31, such that in a case in which the obstacle is spaced apart from the left parking line LL in the left direction at the second distance or more, or in a case in which the obstacle is spaced apart from the right parking line LR in the right direction at the second distance or more, the corresponding obstacle may be ignored when the parking route is created.

Meanwhile, the information about the position of the obstacle, which is detected by the obstacle sensing unit 20, may include various values depending on an outer peripheral shape of the obstacle. For example, the information about the position of the obstacle, which is detected by the obstacle sensing unit 20, may include various values depending on a shape of an external appearance of an object which is detected as an obstacle (for example, another vehicle V). In this case, the parking position setting module 31 may calculate a distance between the corresponding obstacle and the vehicle V based on a distance from a point in the external appearance of any obstacle, which is closest to the parking line, to the parking line. Otherwise, the parking position setting module 31 may calculate an average distance between the respective points of any obstacle and the parking line, and may calculate the distance between the corresponding obstacle O and the vehicle V based on the calculated average distance.

As a result, in a case in which the obstacles O2 and O3 exist at both sides of the parking space, the vehicle V is guided and parked to a center between both the obstacles O2 and O3. Therefore, the vehicle V may be safely guided and parked at the parking position or along the parking route where the vehicle V may avoid colliding with both the obstacles O2 and O3.

Of course, the aforementioned geometric condition may not be satisfied due to the obstacles that exist at both sides of the parking space, or the obstacles exist at both sides of the parking space, but the obstacles may be spaced apart from the respective left and right parking lines at the second distance or more. In this case, the parking position setting module 31 determines that no obstacle exists at both sides of the parking space so as to set the parking guide line GL, similar to the configuration that has been described above with reference to FIG. 5.

Meanwhile, referring back to FIG. 2, the route creating unit 30 may include a parking route calculating module 32. The parking route calculating module 32 may calculate the parking route of the vehicle V based on the parking guide line GL or the parking position which is set by the parking position setting module 31. For example, the parking route calculating module 32 may create the parking route of the vehicle V so that the longitudinal central axis C of the vehicle V matches the parking guide line GL.

Next, the automatic parking assistance unit 40 controls the vehicle V or calculates information required to control the vehicle V so that the vehicle V may be automatically parked in accordance with the parking position or the parking route which is created by the route creating unit 30. Specifically, the automatic parking assistance unit 40 may include a display unit 42 which provides visual information, auditory information, or tactile information for providing parking guidance to the driver. The display unit 42 may include a display device, an audible device, a haptic device, or the like, and may provide the driver with the parking guide line GL, the parking position, the movement route, and the like which are created by the route creating unit 30, in visual and auditory manners. For example, the route creating unit 30 may display the parking guide line GL, the parking position based on the parking guide line GL, the movement route, and the like through the display device, or provide voice information messages and the like.

The automatic parking assistance unit 40 may include a steering wheel control unit 41. The steering wheel control unit 41 may automatically control the steering wheel so that the vehicle V may move to the predetermined parking position along the movement route created by the route creating unit 30.

For example, the automatic parking assistance unit 40 assists the driver in operating the steering wheel, or automatically controls the steering wheel. As an example of assisting the driver in operating the steering wheel, a message or voice information "Operate the steering wheel by 15 degrees in a clockwise direction" may be output through the display unit 42.

Because a technology such as a smart parking assistance system (SPAS), which automatically controls the steering wheel so that the vehicle V may be moved along the parking route, has been currently publicly known in the corresponding technical field, a more detailed description thereof will be omitted.

Figure 9:
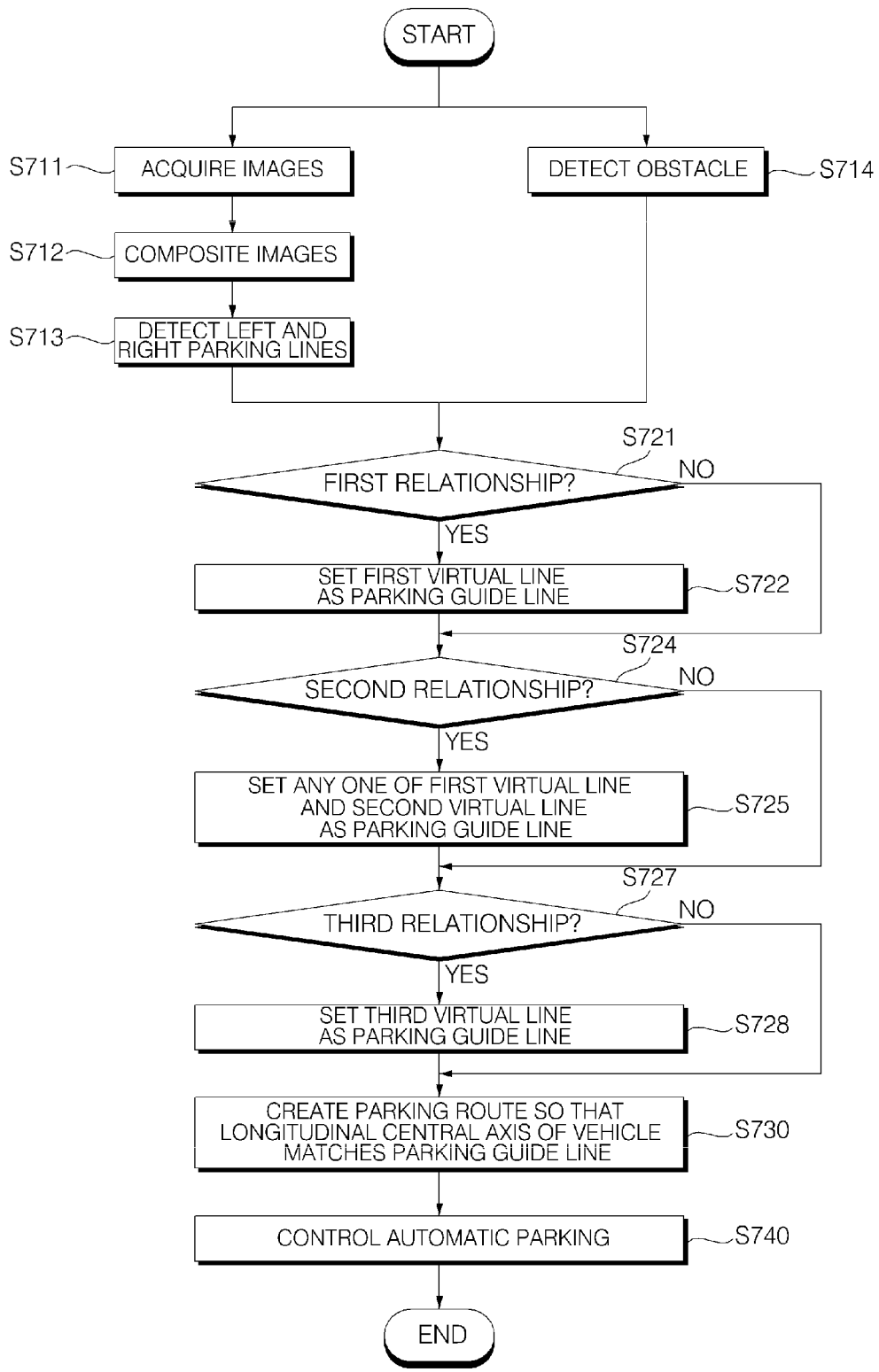
FIG. 9 is a flowchart illustrating an operational method of assisting in parking a vehicle in accordance with the exemplary embodiment of the present invention.

FIG. 9 is a flowchart illustrating a method of operating the parking assistance apparatus S for a vehicle according to the exemplary embodiment of the present invention.

Referring to FIG. 9, as a method of operating the parking assistance apparatus S for a vehicle according to the exemplary embodiment of the present invention, a step S710 of detecting a parking line and an obstacle may be first performed. Specifically, the parking line detecting unit 10 composites images at the periphery of the vehicle V which are acquired by the plurality of cameras, creates a composite image, and applies the edge detection technique to the composite image, thereby detecting the left parking line and the right parking line of the parking space. Specifically, the images, which are photographed by the plurality of cameras, may be acquired (S711), the acquired images are composited to create a composite image (for example, in the form of an around view) (S712), and the left parking line and the right parking line may be extracted by image processing the composite image (S713).

Meanwhile, simultaneously or alternately, the obstacle sensing unit 20 detects the obstacle at the periphery of the parking space (S714). The obstacle may be detected based on a signal sensed by one or more sensors (for example, an ultrasonic sensor), and because this configuration has been described above, a duplicated description will be omitted.

Next, the route creating unit 30 combines information about the position of each of the left parking line, the right parking line, and the obstacle, and sets the parking guide line GL (S720). Specifically, when the left parking line LL and the right parking line LR are detected, the route creating unit 30 may set different parking guide lines GL based on a position relationship between the obstacle and the left parking line LL and the right parking line LR. In this case, the parking guide line GL may be created in a region which is positioned between the left parking line LL and the right parking line LR, and spaced apart from the obstacle at the first distance d1 or more. Of course, it can be understood that in a case in which no obstacle is detected, the parking guide line GL may be set only using information about the positions of the left parking line LL and the right parking line LR.

There may be three or more position relationships between the obstacle and the left parking line LL and the right parking line LR, and representatively, as described above, there may be, first, a first relationship in which no obstacle is detected at the periphery of the parking space, second, a second relationship in which the obstacle is detected only at any one of the left parking line LL and the right parking line LR, and third, a third relationship in which the obstacles are detected at both the left parking line LL and the right parking line LR.

Specifically, the second relationship may be a case in which the first obstacle O1 is detected only in any one region of a region within the second distance in the left direction from the left parking line LL and a region within the second distance in the right direction from the right parking line LR. In addition, the third relationship may be a case in which the second obstacle O2 existing in the region within the second distance in the left direction from the left parking line is detected, and the third obstacle O3 existing in the region within the second distance in the right direction from the right parking line is detected.

The route creating unit 30 may determine whether the position relationship between the obstacle and the left parking line LL and the right parking line LR corresponds to which of the first to third relationships (S721, S724, and S727). Meanwhile, FIG. 9 illustrates the order of the first relationship, the second relationship, and the third relationship, but this example is merely for convenience of description, and the order is not limited. That is, operations of determining the first to third relationships may be simultaneously performed, or may be performed in an order that is different from the order illustrated in FIG. 9.

If the first relationship is determined, the route creating unit 30 may set the first virtual line G1, which is positioned at the same distance from the left parking line LL and the right parking line LR, as the parking guide line GL (S722).

If the second relationship is determined, the route creating unit 30 may set a virtual line, which is further spaced apart from the first obstacle O1 between the first virtual line G1, which is positioned at the same distance from the left parking line LL and the right parking line LR, and the second virtual line G2, which is spaced apart from the first obstacle O1 at the predetermined first distance d1, as the parking guide line GL (S725).

If the third relationship is determined, the route creating unit 30 may set the third virtual line G3, which is positioned at the same distance from the second obstacle O2 and the third obstacle O3, as the parking guide line GL (S728).

When it is determined that the position relationship of the obstacle corresponds to any one the aforementioned three types and the operation of setting the parking guide line GL is completed, the route creating unit 30 may create the parking route of the vehicle V so that the longitudinal central axis C of the vehicle V matches the parking guide line GL set by the parking position setting module 31 (S730).

Meanwhile, when the parking route is created by the route creating unit 30, a step of providing visual and auditory information to the driver or controlling an operation of the steering wheel, by the automatic parking assistance unit 40 may be performed so that the vehicle V may be guided and parked along the parking route (S740). Whether to activate the automatic parking control, may be selectively changed by the driver in the vehicle V.

As described above with reference to FIGS. 1 to 9, the parking assistance apparatus S according to the exemplary embodiments of the present invention determines the parking position, the parking route, or the like by collectively utilizing a result of detecting the parking line based on the image and a result of detecting the obstacle based on the sensor, thereby providing correct parking information to the driver in various situations in accordance with the position relationship between the parking division and the obstacle. In particular, the parking assistance apparatus S may overcome the limitations of the parking assistance apparatus based on ultrasonic and the parking assistance apparatus based on the image in the related art, and may achieve convenience for the driver. That is, the parking assistance apparatus S according to the exemplary embodiments of the present invention may guide, park, and assist the vehicle V to the proper parking position, even in a case in which it is impossible or inconvenient to use the parking assistance apparatus in the related art, such as a case in which no obstacle exists at the periphery of the parking space, or a case in which another vehicle V, which is parked adjacent to the parking space, does not use an appropriate interval with the parking line.

The exemplary embodiment of the present invention is not implemented only by the apparatus and/or method described above, but may also be implemented by a program for realizing a function corresponding to the configuration of the exemplary embodiment of the present invention, or recording media on which the program is recorded, and the implementation may be easily made from the disclosure of the exemplary embodiment described above by experts in the technical field to which the present invention pertains.

In the present invention, various substitutions, modifications, and changes can be made within the scope without departing from the spirit of the present invention by those skilled in the art, and as a result, the present invention is not limited to the aforementioned embodiments and the accompanying drawings, but the entirety or a part of the respective exemplary embodiments may be selectively combined and implemented for various modifications.

What is claimed is:

1. A parking assistance apparatus for a vehicle, comprising:
   a parking line detecting unit which detects a left parking line and a right parking line of a parking space based on an image;
   an obstacle sensing unit which detects an obstacle existing within a predetermined distance based on a sensor; and
   a route creating unit which combines information about positions of the left parking line, the right parking line, and the obstacle, and creates a parking route,
   wherein the route creating unit creates a parking guide line in a region which is positioned between the left parking line and the right parking line and spaced apart from the obstacle at a predetermined first distance or more, when the obstacle is detected by the obstacle sensing unit;
   wherein when an obstacle, which exists in any one region of a region within a predetermined second distance in a left direction from the left parking line and a region within the second distance in a right direction from the right parking line, is detected by the obstacle sensing unit, the route creating unit sets a virtual line, which is further spaced apart from the obstacle between a first virtual line, which is positioned at the same distance from the left parking line and the right parking line, and a second virtual line, which is spaced apart from the obstacle at a predetermined first distance, as the parking guide line.

2. The parking assistance apparatus of claim 1, comprising:
an automatic parking assistance unit which controls automatic parking of a vehicle in accordance with the parking route.

3. The parking assistance apparatus of claim 1, wherein the parking line detecting unit includes:
an image acquiring module which acquires images photographed by a plurality of cameras;
an image compositing module which composites the acquired images and creates a composite image in a form of an around view; and
a parking line detecting module which extracts the left parking line and the right parking line by image processing the composite image.

4. The parking assistance apparatus of claim 1, wherein the route creating unit creates the parking route based on a current position of the vehicle and a position of the parking guide line.

5. The parking assistance apparatus of claim 1, wherein when a second obstacle existing in a region within a predetermined second distance in a left direction from the left parking line, and a third obstacle existing in a region within the second distance in a right direction from the right parking line is detected are detected by the obstacle sensing unit, the route creating unit sets a third virtual line, which is positioned at the a same distance from the second obstacle and the third obstacle, as the parking guide line.

6. The parking assistance apparatus of claim 1, further comprising:
an obstacle map creating unit which creates an obstacle map using information about positions of the left parking line, the right parking line, and the obstacle.

7. The parking assistance apparatus of claim 6, wherein the obstacle map creating unit stores information about the positions of the left parking line and the right parking line, which are initially detected, in the obstacle map.

8. The parking assistance apparatus of claim 1, wherein the route creating unit sets a first virtual line, which is positioned at the same distance from the left parking line and the right parking line, as the parking guide line, when the obstacle is not detected by the obstacle sensing unit.

9. A parking assistance apparatus for a vehicle, comprising:
a parking line detecting unit which detects a left parking line and a right parking line of a parking space based on an image;
an obstacle sensing unit which detects an obstacle existing within a predetermined distance based on a sensor;
a route creating unit which combines information about positions of the left parking line, the right parking line, and the obstacle, and creates a parking route;
an obstacle map creating unit which creates an obstacle map using information about positions of the left parking line, the right parking line, and the obstacle; and
wherein the obstacle map creating unit stores information about the positions of the left parking line and the right parking line, which are initially detected, in the obstacle map,
wherein the obstacle map creating unit estimates a current position of the vehicle using odometry, stores information about the left parking line and the right parking line, which are currently detected, in the obstacle map based on the current position of the vehicle, and calibrates the left parking line and the right parking line, which are currently detected, based on the information about the left parking line and the right parking line which are initially detected.

10. A method of operating a parking assistance apparatus for a vehicle, comprising:
detecting a left parking line and a right parking line of a parking space, and an obstacle; and
creating a parking route by combining information about positions of the left parking line, the right parking line, and the obstacle,
wherein the left parking line and the right parking line are detected based on an image, and
the obstacle is detected based on a sensor,
wherein the creating of the parking route creates a parking guide line in a region which is positioned between the left parking line and the right parking line and spaced apart from the obstacle at a predetermined first distance or more, when the obstacle is detected in the detecting of the left parking line, the right parking line, and the obstacle; wherein when an obstacle, which exists in any one region of a region within a predetermined second distance in a left direction from the left parking line and a region within the second distance in a right direction from the right parking line, is detected in the detecting of the left parking line, the right parking line, and the obstacle, the creating of the parking route sets a virtual line, which is further spaced apart from the obstacle between a first virtual line, which is positioned at the same distance from the left parking line and the right parking line, and a second virtual line, which is spaced apart from the obstacle at a predetermined first distance, as the parking guide line.

11. The method of claim 10, further comprising:
controlling automatic parking of a vehicle in accordance with the parking route.

12. The method of claim 10, wherein the detecting of the left parking line, the right parking line, and the obstacle includes:
acquiring images photographed by a plurality of cameras;
compositing the acquired images and creating a composite image in a form of an around view; and
extracting the left parking line and the right parking line by image processing the composite image.

13. The method of claim 10, wherein the creating of the parking route creates the parking route based on a current position of the vehicle and the position of the parking guide line.

14. The method of claim 10, wherein when a second obstacle existing in a region within a predetermined second distance in a left direction from the left parking line, and a third obstacle existing in a region within the second distance in a right direction from the right parking line is detected are detected in the detecting of the left parking line, the right parking line, and the obstacle, the creating of the parking route sets a third virtual line, which is positioned at a same distance from the second obstacle and the third obstacle, as the parking guide line.

15. The method of claim 10, wherein the creating of the parking route sets a first virtual line, which is positioned at the same distance from the left parking line and the right parking line, as the parking guide line, when no obstacle is detected in the detecting of the left parking line, the right parking line, and the obstacle.

\* \* \* \* \*